July 14, 1936.   F. C. BLANCHARD   2,047,352
AUTOMATIC LUBRICATION SYSTEM
Filed Feb. 21, 1935   4 Sheets-Sheet 1

Inventor:
Frederick C. Blanchard,
By Emery, Booth, Varney & Townsend
Attys

July 14, 1936.  F. C. BLANCHARD  2,047,352
AUTOMATIC LUBRICATION SYSTEM
Filed Feb. 21, 1935   4 Sheets-Sheet 2
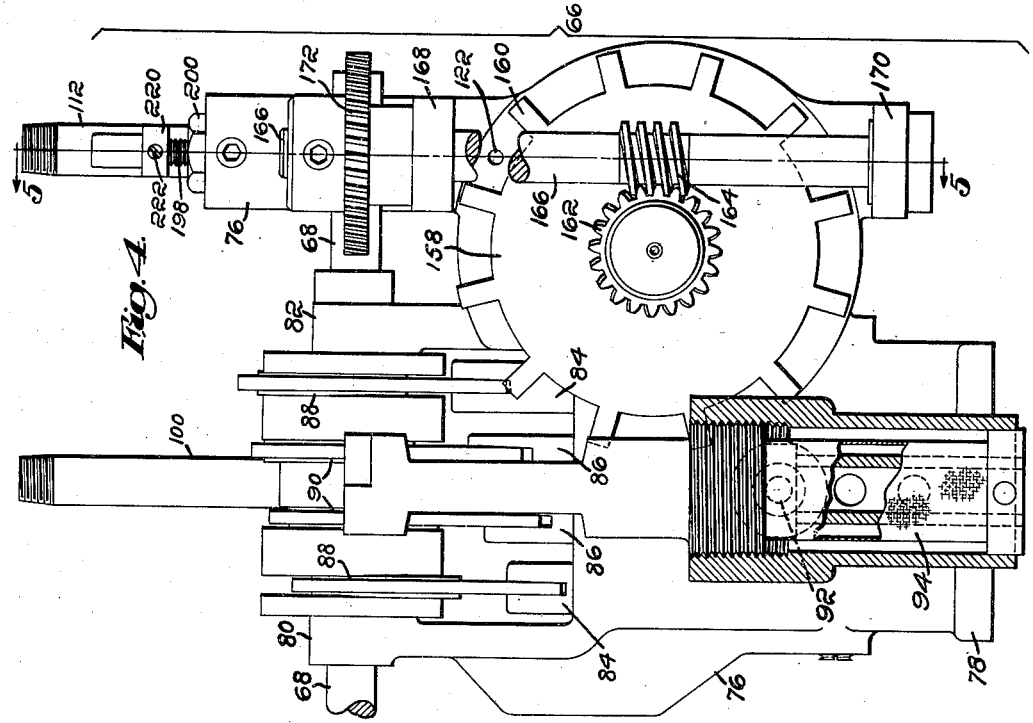
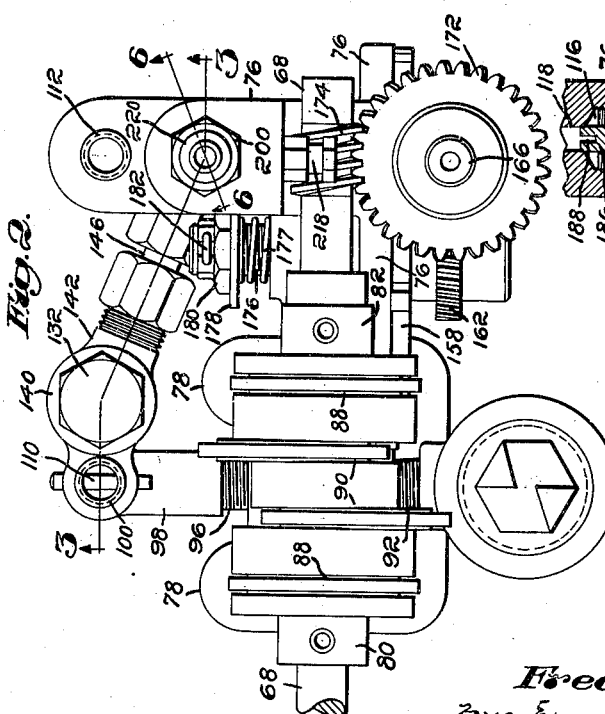
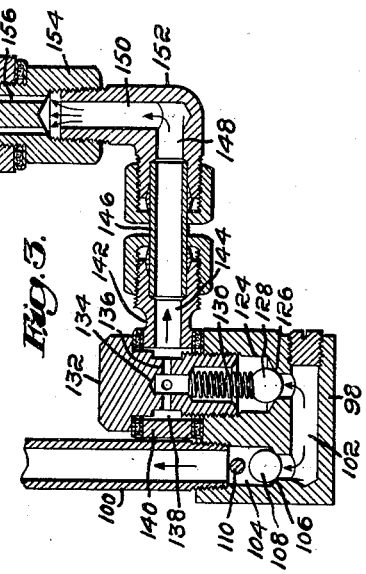
Inventor:
Frederick C. Blanchard,
by Emery, Booth, Varney & Townsend
Attys

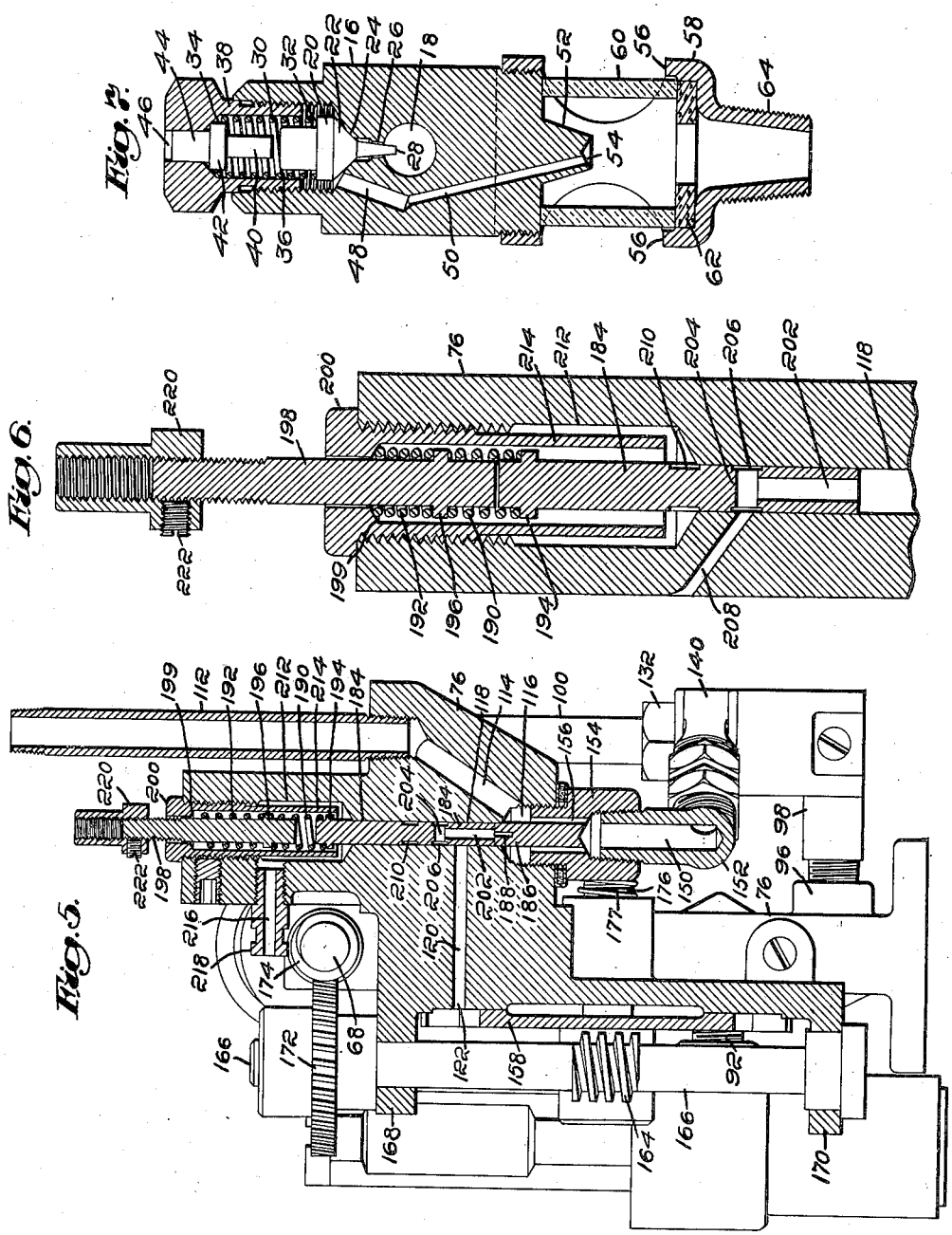

July 14, 1936.   F. C. BLANCHARD   2,047,352
AUTOMATIC LUBRICATION SYSTEM
Filed Feb. 21, 1935   4 Sheets-Sheet 4

Inventor:
Frederick C. Blanchard,
by Emery, Booth, Varney & Townsend
Attys

Patented July 14, 1936

2,047,352

UNITED STATES PATENT OFFICE 2,047,352

AUTOMATIC LUBRICATION SYSTEM

Frederick C. Blanchard, Brookline, Mass.

Application February 21, 1935, Serial No. 7,489

19 Claims. (Cl. 184—7)

This invention relates to automatic lubrication systems and is more especially concerned with a system having special application to the lubrication of industrial machinery of various kinds. It is a further development of the system which is the subject matter of United States Letters Patent No. 1,900,754 issued to me March 7, 1933.

In the illustrative example of the present invention, as in the aforesaid patent, one or more, usually a large number of pressure responsive feeders, one for each bearing, are supplied by a conduit to which lubricant is supplied in excess of the requirements of the feeder or feeders by pressure producing means such as a power driven pump and the lubricant in the conduit is subjected alternately to relatively low and high pressures to which the feeder or feeders respond by opening and feeding oil to the bearing or bearings when the pressure exceeds a certain value, and closing when the pressure falls below said value. In the illustrative example, as in the aforesaid patent, the conduit has an outgoing portion from a reservoir and a return portion to the reservoir, and the pressure pulsations are caused by the opening and closing of a power driven valve at the return portion of the conduit.

The feeder supply conduit usually is of considerable length and it supplies a large number of feeders and it often supplies the feeders for the bearings of a large number of machines. If the conduit is of great length, as, for example, longer than about seventy-five feet, the "low" pressure to which it is desired that the feeders shall not respond is apt to become too high in the system disclosed in the aforesaid patent, so high, in fact, as to cause the feeders to emit a little oil between the "high" pressure periods during which the feeders are intended to feed.

The object of the present invention is to provide means to limit the "low" pressure to an intensity insufficient to cause the feeders to open even to the slightest extent. By thus limiting the "low" pressure to an intensity well below that which is required to open the feeders, it is possible to employ a conduit of much greater length to serve a greater number of machines or a single machine having a greater number of bearings, and yet with the assurance that there will be no emission of oil from the feeders during the periods when it is desired that they should not feed.

The invention will best be understood by reference to the following description when taken in connection with the accompanying drawings of one specific embodiment thereof, while its scope will be pointed out more particularly in the appended claims.

In the drawings:

Fig. 2 is a plan of the pumping and pulsation producing unit;

Fig. 3 is a sectional view on line 3—3 of Fig. 2 illustrating the by-pass arrangement by which the "low" pressure is limited to a value below that required to open the feeders;

Fig. 4 is an elevation partly in vertical section of the pumping and pulsation producing unit;

Fig. 5 is a sectional view on line 5—5 of Fig. 4;

Fig. 6 is a sectional view on an enlarged scale on line 6—6 of Fig. 2;

Fig. 7 is a sectional view of one of the feeders on line 7—7 of Fig. 1; and

Figure 1:
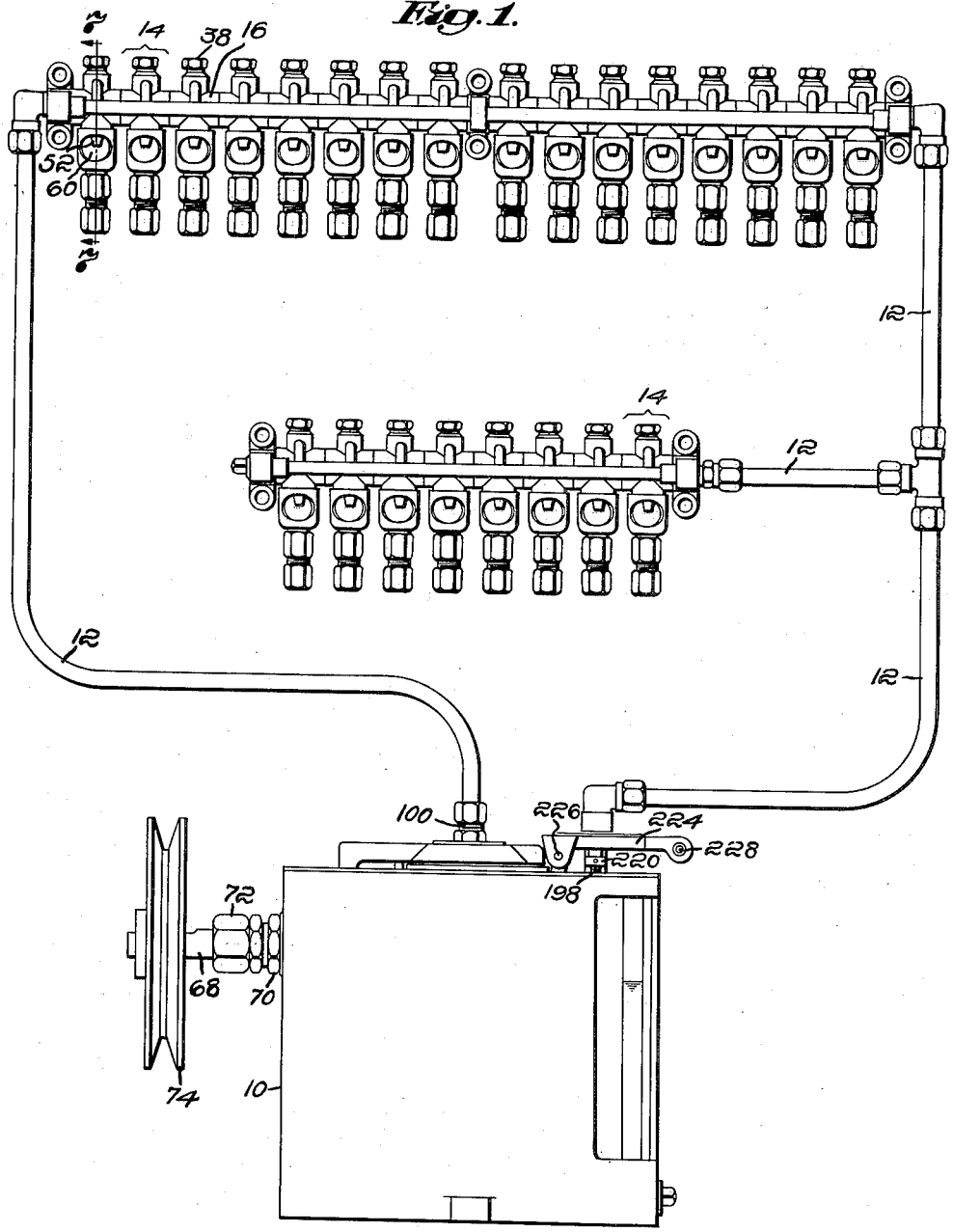
Fig. 1 is an elevation of a lubrication system embodying the invention, the circulation conduit, however, being shown very short because of space limitations.

Referring to the drawings and to the embodiment of the invention illustrated therein by way of example, and having reference at first to Fig. 1, there is shown a lubrication system comprising a tank 10 presenting a reservoir for oil. Leading from and back to the reservoir is a conduit system comprising a plurality of pipe sections 12 and one or more feeders 14 which in the present example are "through" feeders combined end to end in gangs.

The feeder illustrated in Fig. 7 and described and claimed in my co-pending application, Ser. No. 1,360, filed January 11, 1935, and shown herein by way of example, comprises a body or casing 16 provided with a supply passage 18 which is a part of the circulatory conduit system. The valve (using the term in a general sense), which is to be opened and closed by the pressure pulsations, herein comprises a member 20 having a conical portion 22 constituting the valve per se cooperating with a seat 24 herein formed as a part of the casing 16, the angle of the cone in the present example being approximately forty-five degrees. Between the valve seat and the supply passage 18 there is a metering orifice 26 which is controlled by a metering element, herein a metering pin 28. This pin has a very slight taper such as three degrees to its longitudinal axis. The metering orifice in the lowest position of the metering pin affords a minimum effective clearance of a few ten-thousandths of an inch. This clearance space permits the lower end of the valve to be subjected to the pressure of the oil within the supply passage 18, thereby to lift the valve from its seat and to retract the metering pin within its orifice.

The valve is arranged to respond to a predetermined pressure in the supply passage 18 as by being loaded by a spring 30 whose lower end rests against an abutment 32 on the valve and whose upper end rests against a movable abutment which in this example is a shoulder 34 at the upper end of an axial chamber 36 in a screw 38 which is threaded into the valve casing 16. The spring is "scaled" (i. e., made the desired strength) to hold the valve on its seat until the desired opening pressure occurs. The amount which the valve will open and the corresponding effective area of the metering orifice is determined by an appropriate stop herein a pin 40 having an enlargement 42 to center the spring 30 and having a body 44 which is tightly fitted into an axial hole 46 drilled in the screw 38. By rotating the screw 38 in the proper direction the gap between the lower end of the stop pin 40 and the upper end of the valve member 20 may be varied to predetermine the rate of feed.

As herein shown, the valve and its seat are above the supply passage 18 and when the valve opens oil is permitted to flow upwardly past the valve into the chamber above the valve seat and the oil then gravitates through passages 48 and 50 to a nozzle 52 presenting an outlet 54. The rate of feed is readily observable through openings 56 in a casing 58 which is threaded onto the valve casing 16 and holds a glass tube 60 whose upper end is seated against the valve casing and whose lower end is seated against a gasket 62 which is held under compression. The casing 58 presents a threaded nipple 64 to be screwed into an appropriate opening in or adjacent to the bearing to be lubricated. The rate of feed is increased by turning the screw 38 in one direction, and diminished by turning it in the other. This varies the gap between the lower end of the stop pin 40 and the upper end of the valve member 20 and thus determines the extent of opening movement of the valve and the consequent maximum effective area of the metering orifice when the valve opens.

Returning now to the tank or reservoir, the latter affords a housing for a pumping and pulsation producing unit 66 (see Fig. 4) having a driving shaft 68 which extends through a bearing bushing 70 (see Fig. 1) and packing gland 72 to the exterior of the tank where it is provided with a driving element 74 which may be a pulley or a gear to be connected to and driven by appropriate power means such as an electric motor or by the machine to be lubricated. Where there are several machines to be lubricated, usually the shaft is driven by an electric motor.

The pumping and pulsation producing unit will now be described somewhat in detail, reference being had at first to Fig. 4. The principal part is a casting 76 which has a base 78 secured to the bottom of the tank or reservoir. This casting presents bearings 80 and 82 for the shaft 68. It also presents cylinders for pump pistons 84 and piston valves 86. The pistons are driven by eccentrics 88 and the piston valves by eccentrics 90. The pump is generally similar to that which is disclosed in the aforesaid patent and hence no further detailed description is needed. The pump has an inlet 92 to which oil from the reservoir passes through an appropriate strainer 94 (see Fig. 4) which it is deemed unnecessary further to describe, and the pump has an outlet 96. The outgoing portion of the piping system includes a fitting 98 (see Figs. 2 and 3) and a pipe 100, the upper end of the latter (see Fig. 1) being connected to the pipe section 12. As shown in Fig. 3 the fitting 98 is provided with a horizontal passage 102 and a vertical passage 104, and between these passages is a valve seat 106 for a check valve, herein a ball 108 which holds the oil in the outlying piping system when the pump is not running. The opening movement of the ball valve is suitably limited as by a pin 110.

Referring now to Fig. 5, the return end of the piping system includes a pipe 112 which is threaded into the casting 76, the latter being provided with a passage 114 leading downwardly to a chamber 116. Communicating with the upper end of this chamber is a cylinder 118 which in turn communicates with a passage 120 having an outlet 122 adapted to discharge the returning oil into the reservoir. When this outlet is open the pump circulates oil through the circuit from the reservoir and back again at a comparatively low pressure (in practice approximately thirty pounds per square inch) insufficient to make the feeders respond.

This pressure is limited by a by-pass arrangement now to be described, reference being had to Fig. 3. Within the fitting 98 and above the passage 102 there is a chamber 124 and between said chamber and said passage is a valve seat 126 for an appropriate valve, herein a ball 128, which is urged toward said seat by a spring 130. The load which this spring imposes upon the valve determines the maximum pressure in the conduit system when the outlet 122 at the return end of the system is open. Threaded into the upper end of the chamber 124 is a plug 132 which presents an abutment for the upper end of the spring 130 and is provided with a vertical passage 134 communicating on the one hand with the chamber 124 and on the other hand with one or more, herein a plurality, of horizontal radial passages 136 which lead to an annular passage 138 about the plug. This passage is surrounded by a collar 140 having a neck 142 provided with a passage 144 extending horizontally from the annular passage 138 and communicating by a short pipe 146 with passages 148 and 150 in an elbow 152. The vertical portion of this elbow is threaded into a plug 154 which in turn is threaded into the casting 76 and the plug is provided with one or more, herein a plurality, of passages 156 which lead upwardly to the hereinbefore described chamber 116 which, it will be remembered, communicates by way of the cylinder 118 and the passage 120 (see Fig. 5) with the outlet 122 to the reservoir.

When the resistance to circulation through the piping system or loop line reaches thirty pounds per square inch the ball 128 (see Fig. 3) rises against the resistance presented by the spring 130 and by-passes from the pump outlet back to the reservoir sufficient oil to limit the circulation pressure in the system to thirty pounds per square inch. As the feeders are set to open at a pressure of let us say sixty pounds per square inch it will readily be understood that the by-pass arrangement affords a safe margin between the circulating pressure of thirty pounds and the feeder opening pressure of sixty pounds. Accordingly there is never any danger of the feeders emitting oil during the circulation pressure period even when the piping system is of great length. In fact, by the use of the by-pass the length of the circulation loop line is not limited.

Returning now to the outlet 122 (see Fig. 5), when this outlet is closed as by a valve 158, the pressure in the system rises abruptly to a relatively high value (in practice about one hundred and fifty pounds) which is more than sufficient to make the feeders respond and to open. The degree of pressure which is developed in the system when the valve 158 closes the outlet 122 is determined by a pressure relief valve presently to be described. In the present example the valve 158 is a slowly rotating plate having a series of spaced lobes 160 (see Fig. 4) which successively close the outlet 122. This plate is power driven as by appropriate mechanism connecting the same to the pump driving shaft 68, the driving mechanism in the present example comprising a worm gear 162 which meshes with and is driven by a worm 164 suitably formed on or secured to a vertical shaft 166 which is mounted in upper and lower bearings 168 and 170. To the upper end of this shaft is secured a worm gear 172 which (see Fig. 2) meshes with and is driven by a worm 174 suitably formed on or secured to the pump driving shaft 68. The plate valve 158 is maintained in firm engagement with the adjacent face of the casting 76 as by securing the plate valve and the worm gear 162 to a shaft 176 which extends through said casting and is encircled on the opposite side of the latter by a spring 177 which rests at one end against the casting and at its other end against a washer 178 held in place on the shaft by a nut 180 threaded onto the latter and held in fixed position thereon as by a cotter pin 182. This spring therefore constitutes an automatic take-up which prevents leakage of the valve when the latter is closed.

When the return end outlet 122 (see Fig. 5) of the circulating system is closed by one of the lobes on the plate valve 158, there is produced in the system a comparatively high pressure for a brief interval of time, the pressure being of sufficient intensity to cause the feeders to respond. The intensity of this pressure is limited by a relief valve 184 which is movable vertically in the cylinder 118 and has its lower end exposed to the pressure within the chamber 116. The downward movement of this valve is limited by a stop in the form of a stem 186 presented by the plug 154 and the upper end of this stem is provided with a slot 188 which affords access of the pressure in the chamber 116 to the lower end of the relief valve 184. The relief valve is suitably spring loaded as by two springs 190 and 192 best shown in Fig. 6. The lower end of the spring 190 rests against an abutment 194 near the upper end of the relief valve and at its upper end against an abutment 196 presented by a plunger 198. The lower end of the spring 192 rests against the abutment 196 while its upper end is adapted to engage an abutment 199 presented by a plug 200 which is threaded into the casting 76.

The spring loading on the relief valve is such that during the periods of circulation pressure the valve is lifted at first without resistance because the upper spring 192 has not yet engaged the abutment 199 and upon further upward movement of the relief valve a very slight compression of the springs 190 and 192 occurs and the lower end of the relief valve uncovers the adjacent end of the passage 120 (see Fig. 5), thus allowing the oil returning from the incoming end of the conduit system as well as the oil from the hereinbefore described by-pass arrangement to escape through the passage 120 to the reservoir.

The relief valve is provided with a vertical passage 202 (see Fig. 6) extending from its lower end upwardly and communicating with a horizontal passage 204 which in turn communicates with an annular groove 206. When a lobe 160 on the power driven plate valve 158 closes the outlet end of the passage 120, the pressure rises abruptly and lifts the relief valve 184. The relief valve rises until its annular groove 206 registers with a relief port 208 leading to the reservoir, and permits the escape of sufficient oil to limit the pressure in the circulation line to that which is desired (for example, one hundred and fifty pounds), the pressure being predetermined by the spring loading on the relief valve. In the present example the passage 208 is inclined upwardly and at a proper angle to cause the oil which is discharged therefrom to be sprayed upon the driving shaft and eccentrics of the pump.

Although the relief valve is provided with an annular oil sealing groove 210 to prevent excessive leakage of oil upwardly about the relief valve, there is nevertheless some leakage of oil into an annular chamber 212 about a depending skirt 214 on the plug 200 and from this chamber a small amount of oil is conducted through a passage 216 (see Fig. 5) in a nozzle 218 from whose outer end oil drips onto the worm 174 and lubricates the latter as well as the worm gear 172.

The upper end of the plunger 198 is threaded to receive a vertically adjustable collar 220 which is provided with a set screw 222 by means of which its adjustment, when properly determined, may be fixed, and the upper end of this collar which is above the top of the reservoir 10 engages a lever 224 (see Fig. 1) which is mounted on a pivot 226 at one end and it is provided at its other end with an eye 228 to which may be attached a depending chain, cord or wire. A downward pull upon this end of the lever causes the lever to depress the plunger 198 and to load the relief valve to such an extent as to result in the flooding of the feeders at high pressure. In the ordinary operation of the system, however, the lever is vibrated at regular intervals and visually indicates the proper circulation of oil and the development of pulsation pressure.

Figure 8:
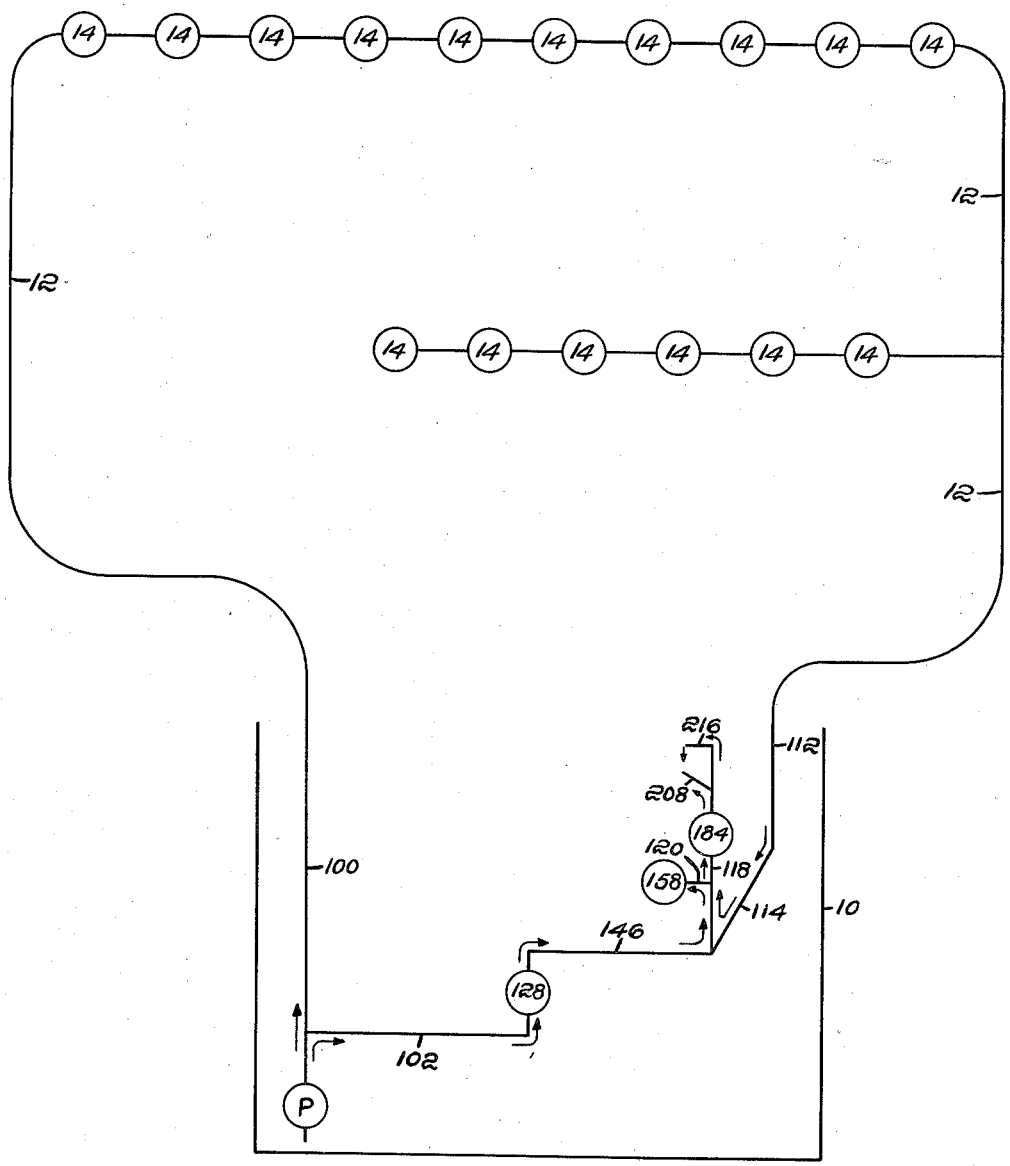
Fig. 8 is a diagrammatic view illustrating the general operation of the system.

While the general operation of the system should be evident from the foregoing description, it will be reviewed briefly in connection with Fig. 8 which is a diagrammatic view of the system in which some of the parts are symbolized by circles enclosing reference characters of the parts in question. The pump is designated P.

When the power driven valve 158 is open, part of the output of the pump P is circulated through the loop line in the direction of the arrows thereon and is discharged through the outlet passage 120 to the reservoir. The remainder of the output flows through the by-pass, under the control of the spring-loaded valve 128, joins the oil returning from the loop line, and is discharged through the outlet passage 120 to the reservoir. The loading of the valve 128 determines the pressure (for example, thirty pounds) developed in the outlying conduit system, and as the feeders 14 are loaded to open at a much higher pressure (for example sixty pounds) there is no danger of emission of oil from the feeders while the power driven valve 158 remains open. Hence it is possible to use a much longer loop line and to take care of machines having a larger number of bearings.

When the power driven valve 158 closes the outlet passage 120, the spring loaded by-pass valve 128 closes, the entire output of the pump passes through the loop line and the pressure in the loop line rises abruptly to the maximum pressure determined by the loading of the relief valve 184, the latter releasing enough oil through the passage 208 to the reservoir to limit the pressure to that which is desired (for example, one hundred and fifty pounds). As soon as the pressure reaches the value to which the feeders are set (for example, sixty pounds) the feeders will open and discharge oil to the bearings, and will remain open during the brief period while the power driven valve 158 remains closed.

When the valve 158 opens, the by-pass again diverts part of the pump outlet to the reservoir, and the low circulation pressure is restored, thus permitting the spring loaded feeders 14 to close. In practice, each feeder is adjusted to determine the amount of oil which is delivered to its bearing. This amount may be from two or three drops per hour to substantially a stream, depending upon the requirements of the particular bearing which the feeder serves.

Having thus described one embodiment of my invention, but without limiting myself thereto, what I claim and desire by Letters Patent to secure is:

1. In a lubrication system, the combination of a feeder supply conduit, means continuously to supply lubricant to said conduit and to subject said lubricant alternately to a continuous succession of relatively low and high pressures at recurring predetermined intervals, means to predetermine the maximum low pressure in said conduit, and a pressure responsive feeder supplied by said conduit and having means to cause said feeder to open at a pressure above that predetermined by the second-mentioned means.

2. In a lubrication system, the combination of a feeder supply conduit, means continuously to supply lubricant to said conduit and to subject said lubricant alternately to a continuous succession of relatively low and high pressures at recurring, predetermined intervals, a by-pass arrangement to predetermine the maximum low pressure in said conduit, and a pressure responsive feeder supplied by said conduit and having means to cause said feeder to open at a pressure above that predetermined by said by-pass arrangement.

3. In a lubrication system, the combination of a feeder supply conduit, means continuously to supply lubricant to said conduit and to subject said lubricant alternately to a continuous succession of relatively low and high pressures at recurring, predetermined intervals, means including a spring loaded valve to predetermine the maximum low pressure in said conduit, and a pressure responsive feeder supplied by said conduit and having means to cause said feeder to open at a pressure above that predetermined by the second-mentioned means.

4. In a lubrication system, the combination of a feeder supply conduit, means including a reservoir and a pump continuously to supply lubricant to said conduit and to subject said lubricant alternately to a continuous succession of relatively low and high pressures at recurring, predetermined intervals, means including a by-pass from said pump to said reservoir to predetermine the maximum low pressure in said conduit, and a pressure responsive feeder supplied by said conduit and having means to cause said feeder to open at a pressure above that predetermined by said by-pass.

5. In a lubrication system, the combination of a feeder supply conduit, means continuously to supply lubricant to said conduit and to subject said lubricant to a continuous succession of alternately relatively low and high pressures at recurring, predetermined intervals, a pressure responsive feeder supplied by said conduit and having means to cause said feeder to open when the pressure exceeds a certain relatively low value and to close when the pressure falls below said value, and means to limit the relatively low pressure in said conduit to a value lower than the pressure at which said feeder opens.

6. In a lubrication system, the combination of a feeder supply conduit, means continuously to supply lubricant to said conduit and to subject said lubricant to a continuous succession of alternately relatively low and high pressures at recurring, predetermined intervals, a pressure responsive feeder supplied by said conduit and having means to cause said feeder to open when the pressure exceeds a certain relatively low value and to close when the pressure falls below said value, and means including a spring-loaded valve to limit the relatively low pressure in said conduit to a value lower than the pressure at which said feeder opens.

7. In a lubrication system, the combination of a feeder supply conduit, means continuously to supply lubricant to said conduit and to subject said lubricant to a continuous succession of alternately relatively low and high pressures of recurring, predetermined intervals, a pressure responsive feeder supplied by said conduit and having means to cause said feeder to open when the pressure exceeds a certain relatively low value and to close when the pressure falls below said value, and means including a valve-controlled by-pass to limit the relatively low pressure in said conduit to a value lower than the pressure at which said feeder opens.

8. In a lubrication system, the combination of one or more pressure responsive feeders, a feeder supply conduit, means continuously to supply lubricant to said conduit in excess of the requirements of said feeder or feeders and to subject the lubricant to a continuous succession of alternately, relatively low and high pressures at recurring, predetermined intervals, and means to limit said low pressure to an intensity insufficient to cause said feeder or feeders to respond.

9. In a lubrication system, the combination of one or more pressure responsive feeders, a reservoir, a feeder supply conduit system including a circuit having an outgoing portion from said reservoir and a return portion to said reservoir, means to supply lubricant from said reservoir to said conduit system in excess of the requirements of said feeder or feeders, means to subject the lubricant in said conduit system alternately to relatively low and high pressures, and means to limit said low pressure to an intensity insufficient to cause said feeder or feeders to respond, the last mentioned means including a by-pass from said outgoing portion of said circuit to said return portion.

10. In a lubrication system, the combination of one or more pressure responsive feeders, a reservoir, a feeder supply conduit system including a circuit having an outgoing portion from said reservoir and a return portion to said reservoir, said feeder or feeders being supplied by said circuit, means to supply lubricant from said reservoir to said conduit system in excess of the requirements of said feeder or feeders, means to subject the lubricant in said conduit system alternately to relatively low and high pressures, and means to limit said low pressure to an intensity insufficient to cause said feeder or feeders to respond, the last-mentioned means including a by-pass from said outgoing portion to said return portion.

11. In a lubricating system, the combination of a reservoir for lubricant, a conduit having an inlet from and an outlet back to said reservoir, means to supply lubricant from said reservoir to said inlet and to subject the lubricant in said conduit alternately to relatively low and high pressures, said means including a pump and a power-operated valve which alternately closes and opens said outlet, a pressure responsive feeder supplied by said conduit and having means to cause said feeder to feed when, due to the closing of said outlet by said power-operated valve, the pressure in said conduit exceeds a certain relatively low value and to close when, due to the opening of said outlet by said power-operated valve, the pressure in said conduit falls below said value, and means to limit the relatively low pressure in said conduit to a value lower than the pressure to which said feeder responds, the last mentioned means including a by-pass arrangement leading from said conduit at a point between the outlet of said pump and said feeder to said conduit at a point between said feeder and said power-operated valve.

12. In a lubricating system, the combination of a reservoir for lubricant, a conduit having an inlet from and an outlet back to said reservoir, means to supply lubricant from said reservoir to said inlet and to subject the lubricant in said conduit alternately to relatively low and high pressures, said means including a pump and a power-operated valve which alternately closes and opens said outlet, a pressure responsive feeder supplied by said conduit and having means to cause said feeder to feed when, due to the closing of said outlet by said power-operated valve, the pressure in said conduit exceeds a certain relatively low value and to close when, due to the opening of said outlet by said power-operated valve, the pressure in said conduit falls below said value, and means to limit the relatively low pressure in said conduit to a value lower than the pressure to which said feeder responds, the last mentioned means including a by-pass arrangement leading from said conduit at a point between the outlet of said pump and said feeder to said conduit at a point between said feeder and said power-operated valve, said by-pass arrangement including a spring-loaded valve.

13. In a lubrication system, the combination of a reservoir for lubricant, a loop conduit having an inlet from and an outlet back to said reservoir, a plurality of pressure responsive feeders supplied by said conduit between said inlet and said outlet, a pump which receives lubricant from said reservoir and delivers lubricant to said inlet, said pump having an output in excess of the requirements of said feeders, a power-operated valve which closes said outlet and raises the pressure in said conduit to a value sufficient to cause said feeders to feed, and which opens said outlet, and pressure responsive means to divert part of the output of said pump to said reservoir when said outlet is open.

14. In a lubrication system, the combination of a reservoir for lubricant, a loop conduit having an inlet from and an outlet back to said reservoir, a plurality of pressure responsive feeders supplied by said conduit between said inlet and said outlet, a pump which receives lubricant from said reservoir and delivers lubricant to said inlet, said pump having an output in excess of the requirements of said feeders, a power-operated valve which closes said outlet and raises the pressure in said conduit to a value sufficient to cause said feeders to feed, and which opens said outlet, and a by-pass arrangement leading from said conduit at a point between said pump and said feeders to said conduit at a point between said feeders and said outlet, said by-pass arrangement including a spring-loaded check valve which limits the pressure in said conduit to a pressure insufficient to cause said feeders to feed when said outlet is open, and which prevents the flow of lubricant from the second-mentioned point to the first-mentioned point when said outlet is closed.

15. In a lubrication system, the combination of a loop conduit and a by-pass conduit having a common inlet and a common outlet, a pressure responsive feeder supplied by said loop conduit between said inlet and said common outlet, means to supply lubricant to said loop conduit under pressure, said means having an output in excess of the requirements of said feeder, a power-operated valve which opens and closes said common outlet and causes the lubricant in said loop conduit to be subjected alternately to relatively low and high pressures, and means in said by-pass conduit to cause lubricant to be diverted from said inlet to said common outlet when said common outlet is open and to limit the pressure in said loop conduit to an intensity insufficient to cause said feeder to feed, said feeder having means to cause the same to feed when said power-driven valve closes said common outlet.

16. In a lubrication system, the combination of a loop conduit and a by-pass conduit having a common inlet and a common outlet, a pressure responsive feeder supplied by said loop conduit between said inlet and said common outlet, means to supply lubricant to said loop conduit under pressure, said means having an output in excess of the requirements of said feeder, a power-operated valve which opens and closes said common outlet and causes the lubricant in said loop conduit to be subjected alternately to relatively low and high pressures, and a spring-loaded valve in said by-pass conduit to cause lubricant to be diverted from said inlet to said common outlet when said common outlet is open and to limit the pressure in said loop conduit to an intensity insufficient to cause said feeder to feed, said feeder having means to cause the same to feed when said power-driven valve closes said common outlet.

17. In an automatic lubrication system, the combination of a feeder supply conduit, means continuously to supply lubricant to said conduit and to subject said lubricant alternately to a continuous succession of relatively low and high pressures at recurring, predetermined intervals, said means including a power-driven valve which is open for said low pressure and is closed for said high pressure, means to predetermine the maximum low pressure in said conduit, and a pressure responsive feeder supplied by said conduit and having means to cause said feeder to open at a pressure above that predetermined by the second-mentioned means.

18. In an automatic lubrication system, the combination of a feeder supply conduit, means continuously to supply lubricant to said conduit and to subject said lubricant alternately to a continuous succession of relatively low and high pressures at recurring, predetermined intervals, said means including a power-driven valve which is open for said low pressure and is closed for said high pressure, a by-pass arrangement to predetermine the maximum low pressure in said conduit by by-passing lubricant past said power-driven valve when the latter is open, and a pressure responsive feeder supplied by said conduit and having means to cause said feeder to open at a pressure above that predetermined by the second-mentioned means.

19. In an automatic lubrication system, the combination of a feeder supply conduit, means including a reservoir and a pump continuously to supply lubricant to said conduit and to subject said lubricant alternately to a continuous succession of relatively low and high pressures at recurring, predetermined intervals, means including a by-pass from the outlet side of said pump to said reservoir to predetermine the maximum low pressure in said conduit, and a pressure responsive feeder supplied by said conduit and having means to cause said feeder to open at a pressure above that predetermined by said by-pass.

FREDERICK C. BLANCHARD.